May 29, 1956     L. F. CRABTREE     2,748,374
REMOTE CONTROL SYSTEM
Filed Jan. 7, 1953     2 Sheets-Sheet 1
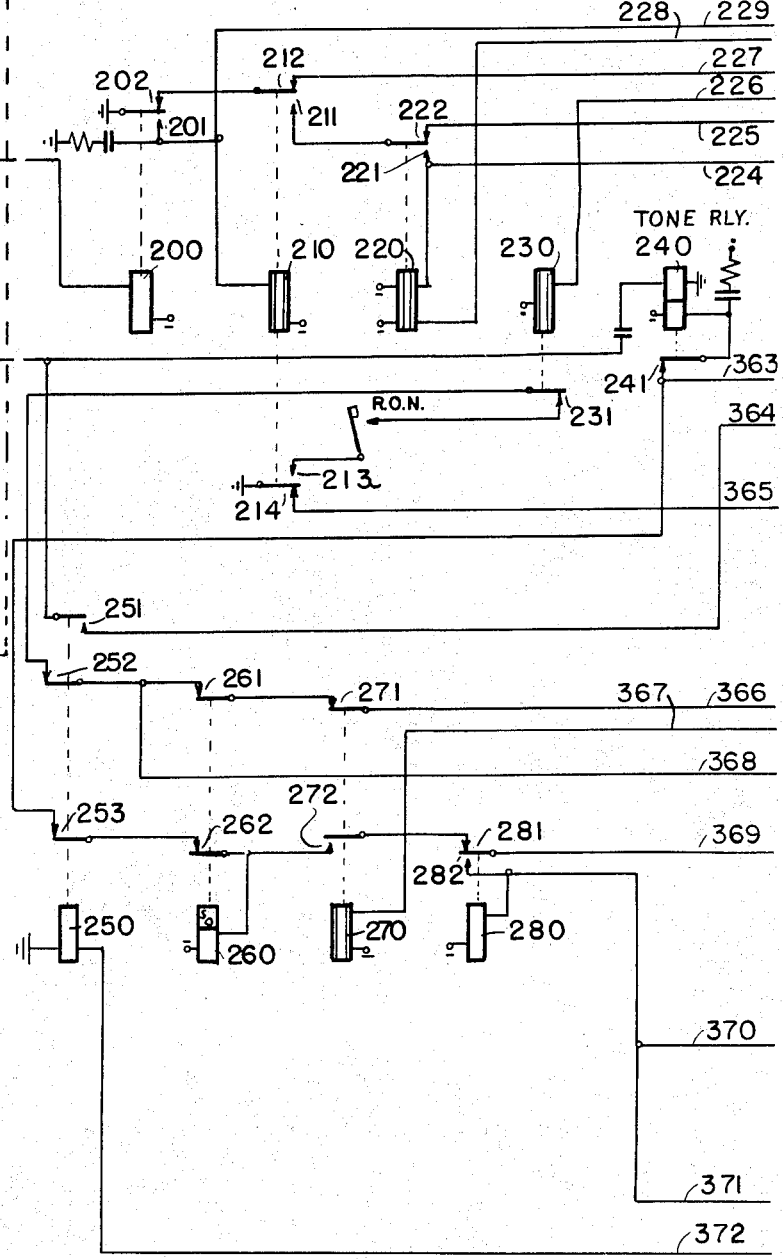
INVENTOR.
LEONARD F. CRABTREE
BY
ATTY.

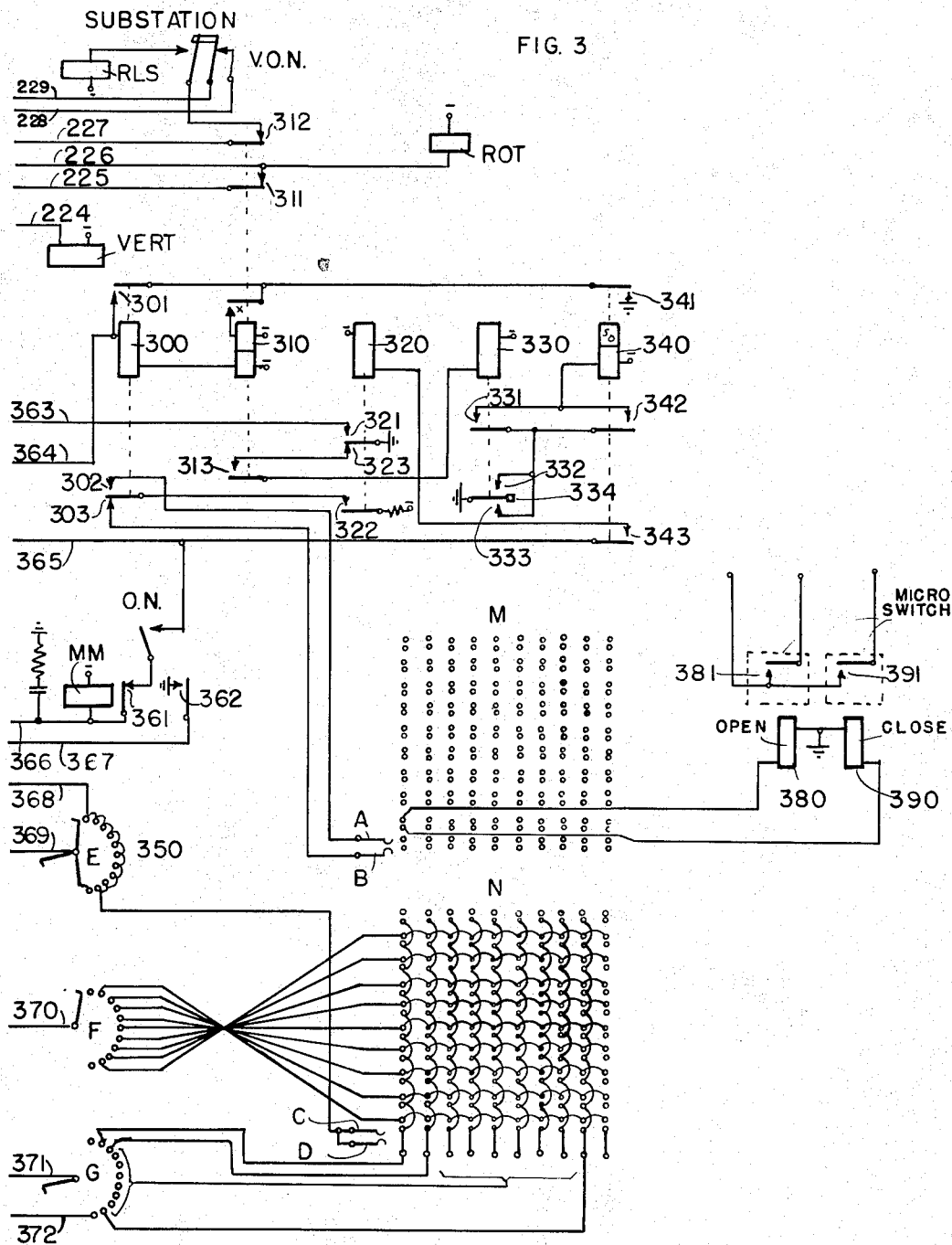

United States Patent Office 2,748,374
Patented May 29, 1956

2,748,374

REMOTE CONTROL SYSTEM

Leonard F. Crabtree, Downers Grove, Ill., assignor to Automatic Electric Laboratories, Inc., Chicago, Ill., a corporation of Delaware Application January 7, 1953, Serial No. 329,957

3 Claims. (Cl. 340—163)

The present invention relates in general to remote control systems. More specifically it relates to a remote control system wherein a selection of the apparatus to be controlled is made by dialling a number corresponding to the apparatus to be operated or controlled and in which a signal is returned to the operator immediately after dialling whereby the operator is informed that the proper selection has been made.

Among the objects of this invention are the securing of a simple, effective and inexpensive signalling system in a remote control system for informing an operator that a proper or improper selection has been made.

Another object is the accomplishment of a remote control function by means of ordinary switch devices used in the telephone industry.

Still another object is the securing of accurate automatic timing of the duration of operation of the controlled apparatus.

Still another object is the reduction of necessary equipment by providing certain common equipment for controlling said apparatus to perform different functions; certain of said equipment also being used for furnishing a signal to the operator.

One of the features of this invention is the circuit arrangement for determining that the correct selection has been effectuated or that an incorrect selection has been effectuated.

Another feature is the arrangement for providing a signal corresponding to the selection made.

Another feature of this invention is the modified rotary switch for accomplishing a scanning operation and activating certain common circuits for signalling the operator that a correct or incorrect selection has been made.

Still other features of this invention are the circuit arrangements for automatically timing the duration of operation of the selected remote apparatus.

Still another feature is the circuit arrangement whereby the selecting switch after its initial operation is enabled to prevent any control function until release is initiated.

Other objects and features including arrangements whereby differing control functions are exercised over certain common equipment will become apparent on further reading of the specification and claims.

Generally in controlling remote functions a circuit key at a control station is operated which in turn starts a telephone rotary switch therein hunting for the particular key while pulses are simultaneously sent to a substation so that the proper selection may be made at the substation. This necessitates the use of a number of circuit keys corresponding to the number of apparatus which may be selected while in addition a switch at the substation is stepped in accordance with sent pulses and another circuit is completed from the substation to the control station for signalling the control station as to the selection made. In the present system a number is dialled by the operator at the control station corresponding to the particular apparatus to be selected. The dialled number results in the stepping of a telephone type selecting switch to a corresponding position so that circuits are prepared for operating the desired apparatus. Immediately after completion of the dialling operation a modified rotary switch is operated for scanning a bank of the selecting switch in which bank are marked the contacts corresponding to the dialled number. This rotary switch is a three level switch, the first level of which is used for control purposes and the second and third levels, the wipers of which levels are clipped, are used for scanning respectively for the marked contacts corresponding to the tens and units digits dialled. The third level of the scanning switch makes contact only after the second level wiper has been stepped from its contacts. As the wiper of the second level is stepped to make contact with a marked contact of the selecting switch bank a number of tone pulses are sent back to the operator corresponding to the first digit of the number of the marked contact. The same function is performed by the third level of the rotary switch to send pulses corresponding to the last digit of the number.

The present embodiment of the invention is designed primarily for the control of the operating mechanism of type A D F A Barber-Coleman motor steam valves each of which requires about a 10 second closure of its operating mechanism to start it toward its "open" or "close" position after which preliminary impulse the valve operating mechanism "locks in" and drives the valve to its extreme position and then cuts itself off.

The control station is located some distance from the substation and between the two stations are only one pair of conductors and a common ground in this instance provided by steam pipes interconnecting the two stations. Both the selecting switch and the rotary scanning switch are located at the substation. The selecting switch is arranged with two banks, one of which banks is swept by a pair of wipers for the purpose of effectuating a selection of the desired valve operating mechanism while either of the said pair wipers may be used for completing a circuit to the valve operating mechanism to thereby either perform an opening or closing operation dependent on which wiper of the pair is selected. The other bank of the selecting switch is swept by another pair of wipers, this for the purpose of marking both the row and column in which the selection is made to thereby mark the location of the contacts of the selected valve. The rows of this last bank are each commonly connected ot a corresponding contact of the second level of the rotary scanning switch while the columns of this bank are each commonly connected to a corresponding contact in the third level of the scanning switch so that when the wiper of the second level is sweeping its contacts a number of tone signals are received at the control station corresponding to the number of rows swept until the contact corresponding to the row in which the selection was made is reached after which the tone signals are terminated, so that the operator at the control station knows immediately that the proper tens selection was made. After a short pause the wiper of the third level of the rotary scanning switch is brought into play for the purpose of sweeping the contacts marked in accordance with the column in which the selection was made while simultaneously tone signals corresponding to the number of columns swept are received at the control station so that the operator knows immediately that the units selection has been properly made.

Referring to the drawings,

Fig. 1 represents the apparatus at the control station and includes a dial key, dial and a speaker whereby tone pulses are received at the control station corresponding to the dialled number.

Figs. 2 and 3 show the circuit arrangements for the selecting switch and the rotary scanning switch both of which are located at the substation. It will be noted at this time that the apparatus to be controlled in this particular embodiment are the operating mechanisms of Barber-Coleman steam valves and that they are controlled for the purpose of either closing or opening them depending on their previous position. The selecting switch is the ordinary type vertical and rotary stepping switch used in telephone systems which has four wipers. The first two wipers of said selecting switch are used for establishing circuits from the bank M associated with these wipers to the selected valve operating mechanisms and the last set of two wipers of said selecting switch is used for marking a tens and units contact in its respective bank N which is scanned by the aforementioned rotary switch.

Proceeding now with the detailed operation, closing of dial key 20 initiates the operation as obvious circuits are completed for lighting lamp 30 and operating relay 200 over line conductor 62 of line 60. Operation of relay 200 closes contacts 201 and completes an obvious circuit for slow-to-release relay 210. Relay 210 on operating at contacts 211 prepares a circuit to the upper winding of relay 220 and the vertical magnet VERT of the selecting switch while at contacts 213, it prepares a circuit for the motor magnet MM of the rotary switch 350. Closing of contacts 201 by relay 200 simultaneously completes a circuit for operating the lower winding of slow-to-release relay 220 over conductor 229, vertical off-normal springs V. O. N., conductor 228 and the lower winding of relay 220. Relay 220 on operating prepares a further point in the circuit at contacts 221 for energizing the vertical magnet of the selecting switch and the upper winding of relay 220. In this particular embodiment the number 21 will be dialled to select one of the Barber-Coleman valves corresponding thereto out of a total of a possible 100 valves to be selected. The operator by operating dial 10 will then open and close the circuit to relay 200 twice on dialling of the first digit 2. Relay 200 on releasing twice will close and open at contacts 202 the circuit to the vertical magnet twice causing it to step the selecting switch to its second level thus moving wipers A, B, C and D to the same level. As the first step is taken by the selecting switch the vertical off-normal springs V. O. N. open and prepare a circuit for the release magnet RLS of the selecting switch which magnet however does not operate at the present time. The circuit to the lower winding of slow-to-release relay 220 is opened when the vertical off-normal spring V. O. N. changes position, however the upper winding of relay 220 had been energized when contacts 202 close and remains energized so that the vertical magnet of the selecting switch will be energized for the second step over the same circuit namely contacts 202, 211, 221 and conductor 224.

After the first digit is dialled, relay 200 will be held operated, thereby opening contacts 202 and causing relay 220 to deenergize and thereby close contacts 222 and prepare circuits to slow-to-release relay 230 and the rotary stepping magnet ROT of the selecting switch. When the second digit is dialled relay 230 operating on the first pulse over contacts 202, 211, 222, conductor 225, contacts 311 and conductor 226, opens contacts 231 to open a point in the stepping circuit of the motor magnet of rotary scanning switch 350. As the second digit dialled is the digit 1 the rotary magnet is energized once over contacts 202, 211, 222, conductor 225 and contacts 311 and deenergizes once to rotate the selecting switch one step. The rotary off-normal springs R. O. N. then close and a circuit is now prepared from contacts 213 and the rotary off-normal switch R. O. N. for the motor magnet of switch 350. However this circuit is not completed until relay 230 releases.

A short time after the second digit is dialled relays 220 and 230 release as contacts 202 are open and a circuit is now closed to the motor magnet of rotary switch 350 over contacts 213, the rotary off-normal springs R. O. N. of the selecting switch, contacts 231, contacts 252, contacts 261, contacts 271 and conductor 366. The motor magnet energizes but does not step rotary switch 350 until it deenergizes. The motor magnet on energization opens contacts 361 and closes contacts 362. Contacts 362 on closing completes a circuit for slow-to-release relay 270 over conductor 367. Relay 270 operates and on operating closes contacts 272 to prepare a circuit to the switch wiper of level E of scanning switch 350 and opens contacts 271 to cause the motor magnet of scanning switch 350 to deenergize and step the scanning switch to its first contact. The off-normal springs O. N. of rotary switch 350 are closed on its taking its first step for a purpose to be described. Level E of the scanning switch on being stepped to its first contact forwards ground from contacts 213, rotary off-normal spring R. O. N., contacts 231, contacts 252, conductor 368, contacts and wiper of level E, over conductor 369, contacts 281, contacts 272 to relay 260 and also over contacts 262, 253, 241 and the lower winding of tone relay 240. Relay 260 is slow-to-operate and does not operate until tone relay 240 has sent a tone pulse over line conductor 61 of line 60 to operate loud speaker 50 and thereby provide an audible signal indicating that the scanning switch 350 has been stepped to its first contact. The wiper of level F at this time finds an open contact and therefore completes no circuits. The wiper of level G as yet is not in contact with any of its contacts. Relay 260 operates a moment after the first tone has been sent and opens contacts 261 to open a second point in the energization circuit of the motor magnet and opens contacts 262 to halt the operation of tone relay 240. The motor magnet on deenergization had opened contacts 362 to thereby cause the restoration of relay 270 which in turn allows contacts 271 to close and opens contacts 272. Opening of contacts 272 causes the release of relay 260 which in turn allows contacts 262 and 261 to close. Closing of the contacts 261 again completes an energization circuit for the motor magnet which in turn closes the previously described circuit for relay 270 and the described stepping and tone operation is again repeated on the stepping of rotary switch 350 to its second contact. A second tone pulse is thereby sent over loud speaker 50. The next operation of the motor magnet results in the stepping of switch 350 to its third contact where wiper F finds ground forwarded from the contacts of level E to the selector switch wiper C and the second row of the bank contacts which ground is forwarded over conductor 370 to operate relay 280. Relay 280 on operating opens contacts 281 to prevent a circuit being completed to relays 260 or tone relay 240 and closes contacts 282 so that relay 280 will be held operated while wiper E is stepped over the following contacts. The circuit to relay 270 is again open and it releases to again allow the motor magnet to energize. The motor magnet will now step the rotary switch somewhat more rapidly over the remaining contacts as relays 260 and 240 are no longer in the circuit. Thus the operator at the control station has received two tone signals corresponding to the first digit dialled.

As the wiper of the E level leaves the last contact of switch 350 the holding circuit for relay 280 is opened and relay 280 releases preparing at contacts 281 the previously described circuit to relays 260 and 240. The wiper of level F is now out of engagement with its contacts and the wiper of the level G is stepped to a position where it will engage the first contact of its level on the next step of switch 350. At this time another wiper of level E is in a similar position as the wiper of level G. The stepping operation and tone sending operation will be repeated as previously described with the exceptions that ground will be forwarded from the selecting switch wiper D and the wiper of level G will find ground on being stepped to its second contact connected in common to the first column of bank N of the selector switch which ground will be forwarded to relay 280 and relay 280 will again operate to prevent the sending of more than one tone pulse corresponding to the second digit 1 dialled and the previously described operation for stepping wipers will be repeated. Thus the operator is signalled by two tone pulses followed by a pause and then a single tone pulse indicating that the selecting switch had been stepped to its proper position corresponding to the number 21 dialled by the operator.

As the wiper of level G is stepped to its last position a circuit is completed from battery, the winding of relay 280, conductor 371, the wiper and last contact of level G, conductor 372, winding of relay 250 and ground. Relay 250 on operating closes contacts 251 and opens contacts 252 and 253. Opening of contacts 252 and 253 prevents the circuits from being completed to the motor magnet of switch 350 or tone relay 240 respectively. Closing of contacts 251 prepares a circuit for the operation of the selected apparatus.

The operator at the control station on receiving the desired series of tone pulses will now operate the open-close key 40 momentarily to either the open position or the close position dependent on which operation of the valve he desires. If the key is moved to its closed position a circuit is completed from ground through resistor R72, line conductor 61 of line 60, contacts 251, conductor 364, winding of relay 300 and the winding of relay 310 to battery. Relay 300 does not operate at this time however as resistor R72 is in the circuit, only, relay 310 operates. The lower winding of relay 310 energizes and closes contacts X to prepare a circuit for the upper winding. It also closes contacts 313 to complete a circuit for relay 330 from ground and contacts 323. Relay 310 also opens contacts 311 and 312 to prevent the operation of the release magnet of the selecting switch or the rotary magnet of the selecting switch on later release of relays 200 and 210. The timing relay 330 is operated and it closes contacts 331 and operates the weighted spring armature 334 for closing contacts 332 and thereby completing the obvious circuit for operating slow-to-operate relay 340. Relay 340 on operating closes an alternate operating circuit at contacts 342 and at contacts 341 completes an operating and holding circuit for the upper winding of relay 310. At contacts 343 a circuit is prepared for the operation of relay 320.

The operator at the control station now releases the dial key 20 which results in the extinguishment of lamp 30 and the release of relay 200 which in turn allows release of relay 210 and a circuit is now prepared for the operation of the release magnet of the selecting switch. Relay 210 on releasing completes at contacts 214 a circuit for the operation of relay 320 over conductor 365, and contacts 343 and simultaneously opens the previously described energizing circuit for the motor magnet of rotary switch 350 and completes a homing circuit for it instead over contacts 214, conductor 365, the off-normal spring O. N. of switch 350 and contacts 361 so that switch 350 will now be stepped to its normal position and also release relay 250 as the wiper of level G leaves its last contact. Relay 320 on operating closes contacts 321 and 322 and opens contacts 323. At contacts 321 a circuit is completed for the operation of tone relay 240 over conductor 363 and contacts 241. Relay 240 will send a tone signal as previously described in a self-interrupted manner as it opens contacts 241 each time it is energized and releases contacts 241 on each deenergization to notify the operator that the preliminary impulse to the operating mechanism is occurring. At contacts 322 a circuit is now completed over contacts 303 and wiper B of the selecting switch to relay 390 which relay on operating closes its associated microswitch to start the close operation of its associated valve. This circuit requires about a 10 second closure to start the valve on its operation. Relay 320 on opening contacts 323 had opened the previously described circuit to relay 330 and it now releases causing the weighted spring armature 334 to intermittently open and close contacts 332 and 333. This operation will last for about 10 or 15 seconds depending on adjustment. Contacts 331 are open; however an alternate holding circuit for relay 340 was completed at contacts 342. Relay 340 will remain operated for the described 10 or 15 seconds while armature 334 swings to thereby hold relay 390 operated during the required period and then relay 340 will release thereby opening the circuit to the upper winding of relay 310 at contacts 341 and opening the circuit to relay 320 at contacts 343. Relay 310 will now release and open contacts 313 as the open-close key 40 had been only momentarily operated and therefore the lower winding of relay 310 had deenergized. This prevents the reoperation of relay 320 as contacts 313 remain open. Relay 320 on releasing opens contacts 321 to open the circuit to the tone relay 240 thereby terminating the tone to notify the operator that the preliminary impulse period is completed, and opens contacts 322 to allow the release of relay 390.

Had the operator moved the open-close key 40 to the open position relay 300 would operate in series with the lower winding of relay 310 as resistor R72 would not be in the line. The previously described sequence of operation would then be repeated with the exception that relay 300 is also held operated over contacts 301 and 341 and a circuit would have been completed to the open relay 380 over contacts 322, 302 and wiper A of the selecting switch. Relay 340 would again be held operated for the same 10 or 15 second interval after which it would open the holding circuit for relay 300, 310 and 320 in the same manner as previously described.

Relay 310 on releasing at the end of the open or close operation would close contacts 312 and 311. No circuits would be completed by contacts 311 however a circuit for the release magnet of the selecting switch is completed over contacts 202, 212, 312 and the vertical off-normal springs to thereby restore the selecting switch to normal.

Thus having described my invention and not limiting myself to the particular embodiment disclosed herein, what is claimed is:

1. In a remote control system having a control position, a substation having a plurality of apparatus units, a switching means in the substation, conductors interconnecting said control position and said switching means, manually operated means at the control station for seizing said switching means over one of said conductors, means at the control station for transmitting impulses to said switching means via said one of said conductors corresponding to a plurality of digits, said switching means operated in accordance with the impulses received from said control position for selecting one of said plurality of apparatus units, a scanning switch in the substation having a plurality of banks of contacts, each of several of said banks corresponding to a different digital sequence, means including said switching means for marking in each of said several banks a contact corresponding to one digit of said number in its digital sequence, means for time releasing said switching means, means for operating said switch for finding each of said marked contacts in sequence and for sending timed pulses to said control position via another of said conductors dependent on said marked contacts and corresponding in number and in sequence to the digits dialled for thereby indicating that said selection was properly made, means for automatically cutting off the timed pulses and said switch after one operation thereof to prepare a circuit to the said switching means, means controlled over said circuit to prepare another circuit to the selected apparatus unit, said manually operated means operated to its normal position for initiating the operation of said time releasing means via said first of said conductors to initiate the release of said switching means, and means controlled by the release of part of said switching means for completing said prepared circuit for said selected apparatus unit before the switching means is completely released.

2. A remote control system having a control and a remote station with an impulse sender and a pair of keys in the control station, a stepping switch in the remote station, a single pair of conductors interconnecting said stations, a plurality of apparatus units in the remote station accessible to said switch, means responsive to the movement of one of said keys to its operated position for seizing said switch over one of said single pair of conductors, operation of said sender causing a plurality of series of impulses to be transmitted by said sender over certain of said conductors to said switch to operate said switch to select one of said units and establish a marking corresponding thereto, a second switch at said remote station, means for operating said second switch to scan and find said marking and for transmitting a timed coded series of pulses to said control station corresponding to said marking over certain of said conductors to thereby check the operation of said stepping switch by the plurality of series of impulses transmitted by said sender, means for automatically cutting off said coded series of pulses and said second switch after one operation thereof, and for preparing a circuit to determine whether the selected apparatus unit will be operated in one manner or another, means responsive to the operation of the other of said keys at the control station to control said last circuit over a conductor of said pair of conductors to determine whether said selected unit is to be operated in said one manner or the other, and an apparatus operated only after release of said first key at the control station for operating said selected unit in the manner determined.

3. In a remote control system, a near and a remote station, a plurality of apparatus units at the remote station, a selecting switch at the remote station having a pair of wipers, a pair of conductors interconnecting said stations, a pair of circuits for each unit, a line relay for said switch, means at the near station for seizing said switch and operating said line relay over said conductors to in turn operate said switch to move said wipers into connection with the pair of circuits leading to one of said units, a pair of circuits associated with the switch each leading to one of said wipers, relay means associated with the switch for preparing the circuit to either one of said wipers, a key at the near station operated to one position or another to operate said relay means in one manner or another to determine which of the circuits to said wipers is prepared, means at the near station for releasing said line relay after said key is operated, means controlled by the release of the line relay to initiate the release of said switch, and means for maintaining said switch in operated position for a predetermined time and for completing said prepared circuit during said time before the switch is released.

References Cited in the file of this patent

UNITED STATES PATENTS

| | | |
|---|---|---|
| 1,600,358 | Puckette | Sept. 21, 1926 |
| 1,674,126 | Richardson et al. | June 19, 1928 |
| 1,695,908 | White et al. | Dec. 18, 1928 |
| 1,814,524 | Nelson | July 14, 1931 |
| 1,845,321 | Nelson | Feb. 16, 1932 |
| 2,233,026 | Mock | Feb. 25, 1941 |